United States Patent [19]

Kallenbach et al.

[11] Patent Number: 5,205,581
[45] Date of Patent: Apr. 27, 1993

[54] SYSTEM FOR CONTROLLING A CHASSIS

[75] Inventors: Rainer Kallenbach, Stuttgart; Michael Tischer, Abstatt; Michael Wanner, Holzgerlingen, all of Fed. Rep. of Germany

[73] Assignee: Robert Bosch GmbH, Stuttgart, Fed. Rep. of Germany

[21] Appl. No.: 788,670

[22] Filed: Nov. 6, 1991

[30] Foreign Application Priority Data

Nov. 7, 1990 [DE] Fed. Rep. of Germany ....... 4035313

[51] Int. Cl.$^5$ ............................................ B60G 11/26
[52] U.S. Cl. ................................... 280/714; 280/707
[58] Field of Search ............... 280/702, 707, 709, 714

[56] References Cited

U.S. PATENT DOCUMENTS

| | | | |
|---|---|---|---|
| 3,547,465 | 12/1970 | Hoffmann et al. | 267/64.19 |
| 3,807,678 | 4/1974 | Karnopp et al. | 188/299 |
| 4,620,619 | 11/1986 | Emura et al. | 188/299 |
| 4,743,000 | 5/1988 | Karnopp | 267/218 |
| 4,786,034 | 11/1988 | Heess et al. | 267/64.15 |
| 4,800,995 | 1/1989 | Bernhardt et al. | 188/319 |
| 4,936,423 | 6/1990 | Karnopp | 188/299 |
| 5,013,061 | 5/1991 | Fujimura et al. | 280/707 |
| 5,024,302 | 6/1991 | Karnopp | 188/299 |
| 5,042,834 | 8/1991 | Yonekawa et al. | 280/714 |
| 5,076,606 | 12/1991 | Takahashi | 280/709 |

FOREIGN PATENT DOCUMENTS

| | | | |
|---|---|---|---|
| 0395108 | 10/1990 | European Pat. Off. | 280/707 |
| 3611315 | 10/1987 | Fed. Rep. of Germany. | |
| 0254007 | 10/1990 | Japan | 280/707 |
| 1201983 | 8/1970 | United Kingdom. | |
| 2120355 | 11/1983 | United Kingdom. | |

Primary Examiner—Margaret A. Focarino
Assistant Examiner—Paul Dickson
Attorney, Agent, or Firm—Edwin E. Greigg; Ronald E. Greigg

[57] ABSTRACT

In a system for controlling a chassis, in particular for controlling spring cylinders that can simultaneously perform the function of a semiactive shock absorber and are disposed between wheel suspensions and the vehicle body, at least one chamber of the spring cylinder is intended to communicate via a line or branch line with a pumping device, reservoir or the like for a pressure fluid, and at least one control member is connected between the pump device, reservoir or the like and the chamber. A control valve, which responds to a change in pressure in a shunt between the control valve and a line, is disposed in the control member.

5 Claims, 2 Drawing Sheets

SYSTEM FOR CONTROLLING A CHASSIS

BACKGROUND OF THE INVENTION

The invention relates to a system for controlling a chassis, in particular for controlling spring cylinders that can perform the function of a semiactive shock absorber at the same time and that are disposed between wheel suspensions and the vehicle body.

Especially in automotive engineering, the development of electronic chassis control systems is directed to purposefully adapting the damping characteristic to the particular driving status of the vehicle. Oriented damper adjustment, for example, by means of valves that are adjustable as a function of control signals is done as a function of sensor signals, which detect various parameters of the driving status (such as vehicle speed, vehicle inclination, transverse and vertical acceleration, and up-and-down, pitching and rolling motions). Moreover, in the low-frequency range of vehicle body motions, active interventions should be made, to react to pitching, up-and-down, and rolling motion.

In these control signals, a distinction is made between so-called passive and active control signals. Passive control signals are directed to a slowly adaptive adjustment of the damping as a function, for instance, of driving performance desired by the driver, road conditions, or the vehicle speed.

Active control signals, contrarily, are meant to exert direct influence on the applicable absolute speed of the vehicle body (raising, lowering, pitching, rolling) within the shortest possible periods of time. The entire damper system may be designed such that the passive damping control increases or decreases the damping action in the same direction with respect to tension and compression, while the active damping control makes the damping asymmetrical as a function of external signals, or in other words varies the damping action in opposite directions in the compression and tension stages. The overall result is a so-called semiactive damper system.

A system for controlling shock absorbers is disclosed for instance in German Patent No. 16 30 058. There, two work chambers of a shock absorber or spring strut are connected via external lines to an apparatus that comprises a pump and two reservoirs. Only single-action check valves are provided as valves in the connecting lines to the spring strut. With such an apparatus, however, the damper hardness of a shock absorber cannot be varied, because energy would have to be supplied from outside via the pump for that purpose, which takes a relatively long time and uses a certain amount of power.

German published patent application no. 33 04 815 also shows a way of controlling shock absorbers in which optimization is directed to a middle operating situation in terms of spring hardness and damper hardness; the corresponding parts and their parameters are structurally designed with a view to this. These parameters then remain unchanged during vehicle operation. As a result, however, extreme operating situations, such as an empty vehicle or a fully loaded vehicle in particular, or changing vehicle operating parameters (cornering, braking, acceleration, comfortable superhighway travel, or the like), go undetected.

In U.S. Pat. No. 3,807,678, active intervention is also made into the positive displacement of pressure fluid volume in the shock absorber. To this end, the two work chambers of a shock absorber are each connected crosswise and parallel to one another via oppositely directed valves that allow a flow of pressure fluid solely in one direction; the quantity of pressure fluid admitted by these valves is then furthermore determined "actively" by corresponding triggering of the valves with suitably prepared sensor signals. The externally located spring remains entirely passive, so that the entire system is one of semiactive control.

The above-described semiactive damper control is not adequate for optimal calming of vehicle body motion. That requires a partly active chassis control system, which supplies active energy to the spring cylinder or removes such energy from it.

OBJECT AND SUMMARY OF THE INVENTION

The principal object of the present invention is to make it possible to adjust a low-frequency pressure course, associated with the motion of the vehicle body, in accordance with a set-point value, without allowing high-frequency pressure superpositions, which result in the shock absorber from road conditions, from affecting the final control element.

The invention as defined by the body of claim 1 has the advantage that the applicable control valve, in essential working positions, is not triggered and switched from outside but instead reacts to pressure in the line to the shock absorber chamber, so that this essential parameter need not be detected by pressure sensors and then converted in complicated open- and- closed loop control units. As soon as the pressure in the line toward the chamber changes, the control valve can be addressed and switched to another working position.

Preferably, a shunt from this branch line downstream of the chamber of the spring cylinder is therefore provided, which discharges into a chamber of the control valve, where it can subject a piston of a slide to pressure. In the present exemplary embodiment, this slide has three working positions, namely a return position, a blocking position, and an inflow position. Depending on how high the pressure in the chamber is, the slide is moved to an applicable working position.

However, to enable maintaining a certain outset position, the slide is supported via its position in the chamber against a spring, while on the other end it is engaged by a control magnet. Via this control magnet, switching to certain working positions is also possible; this is true especially for switching to the inflow position, in which the slide must be guided counter to the pressure of the spring in the chamber.

A throttle should preferably be incorporated into the shunt as well, so that not every pressure changer, however slight, will cause switching of the control valve.

The shunt also has a reservoir associated with it, so that pressure fluid cannot be received in this reservoir until the control valve responds. This likewise assures that high-frequency pressure superpositions from uneven road surfaces, in particular, can be intercepted without requiring response by the control valve.

A fast-switching damper valve should also be associated with the control valve. This fast-switching damper valve likewise serves to produce suitably adapted damper forces for damping the wheel and body motion in the presence of considerable unevenness of the road surface. Above all, the control valve should make it possible to set a low-frequency pressure course in accordance with a setpoint value that is involved in the motion of the vehicle body. This purpose is naturally served by suitable pumps and reservoirs as well as control and monitoring devices, which however will not be described in further detail.

The essential feature of the present invention is the control valve, which is very sturdy and virtually independent of temperature.

If a pressure change in the spring strut is specified, then the valve piston is deflected out of its position of repose by the magnet and shifted to a suitable working position. On the basis of the pressure change, a restoring force upon the valve piston arises in the line as well, counteracting the magnet force and moving the valve piston into its position of repose. No external positional control takes place at the valve itself. Less computer capacity on the part of the system computer is necessary, because a closed pressure control loop and signal preparation are unnecessary.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
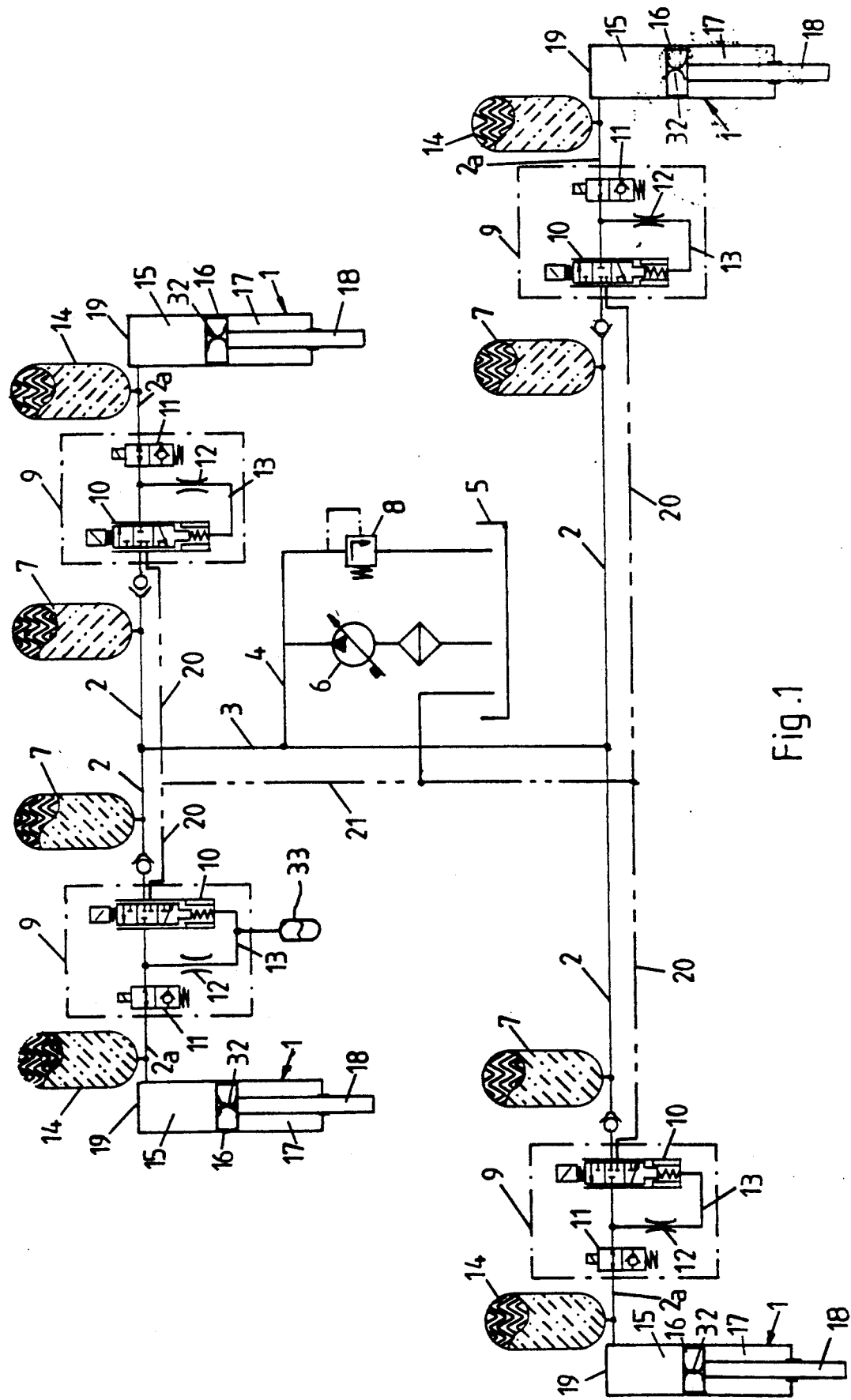
FIG. 1 shows a closed control loop, in the form of a block circuit diagram for a partly active chassis control system.

In FIG. 1, four shock absorbers 1, for instance of a motor vehicle, are each connected via a branch line 2 to a main line 3, into which a line 4 to a supply tank 5 discharges. From this supply tank 5, by means of a pump 6 with the interposition of a pressure limiting valve 8, hydraulic fluid can be drawn and fed into the main line 3. The pump 6 serves primarily to fill reservoirs 7, which as first control elements are incorporated into the applicable branch line 2.

As soon as the reservoirs 7 have been filled to the desired extent, the pump 6 switches off. If the pressure in the line 4 or main line 3 should be overly high because of pumping by the pump 6, then excess hydraulic pressure fluid can drain back out to the supply tank 5, via a pressure limiting valve 8. In this way, even in continuous operation of the pump 6, which is undesirable, the reservoirs 7 are filled with pressure fluid only to a previously set, desired extent.

Each reservoir 7 is followed in each branch line 2 by a control member 9, which substantially comprises a control valve 10, a damper valve 11, and a throttle 12. The control valve 10 will be described in further detail in conjunction with FIG. 2. The damper valve 11 is a fast-switching valve and has an open position and a blocking position on one side, occupied by a check valve, so that a return of pressure fluid from the shock absorber 1 can be prevented. The throttle 12 is located in a shunt line 13, by way of which the chamber 26 (see FIG. 2) in the control valve 10 communicates with the branch line 2 between the damper valve 11 and the control valve 10.

The control member 9 is followed by a further reservoir 14, connected to a cylinder line 2a. This reservoir 14 serves in particular to hold and equalize pressure fluid, if the damper valve 11 is closed.

Downstream of the reservoir 14, the cylinder line 2a discharges into an upper chamber 15 of the shock absorber 1. A damper piston 16 divides the upper chamber 15 from a lower chamber 17, through which a piston rod 18 also passes. The upper chamber 15 and lower chamber 17 together form a cylinder 19, which for instance is secured to a chassis of a motor vehicle, not shown in further detail. The piston 18, contrarily, communicates with a wheel axle, for instance, also not shown in detail.

Besides the branch line 2, a return line 20 also communicates with the control valve 10, and a common connecting line 21 discharges into the supply tank 5.

Figure 2:
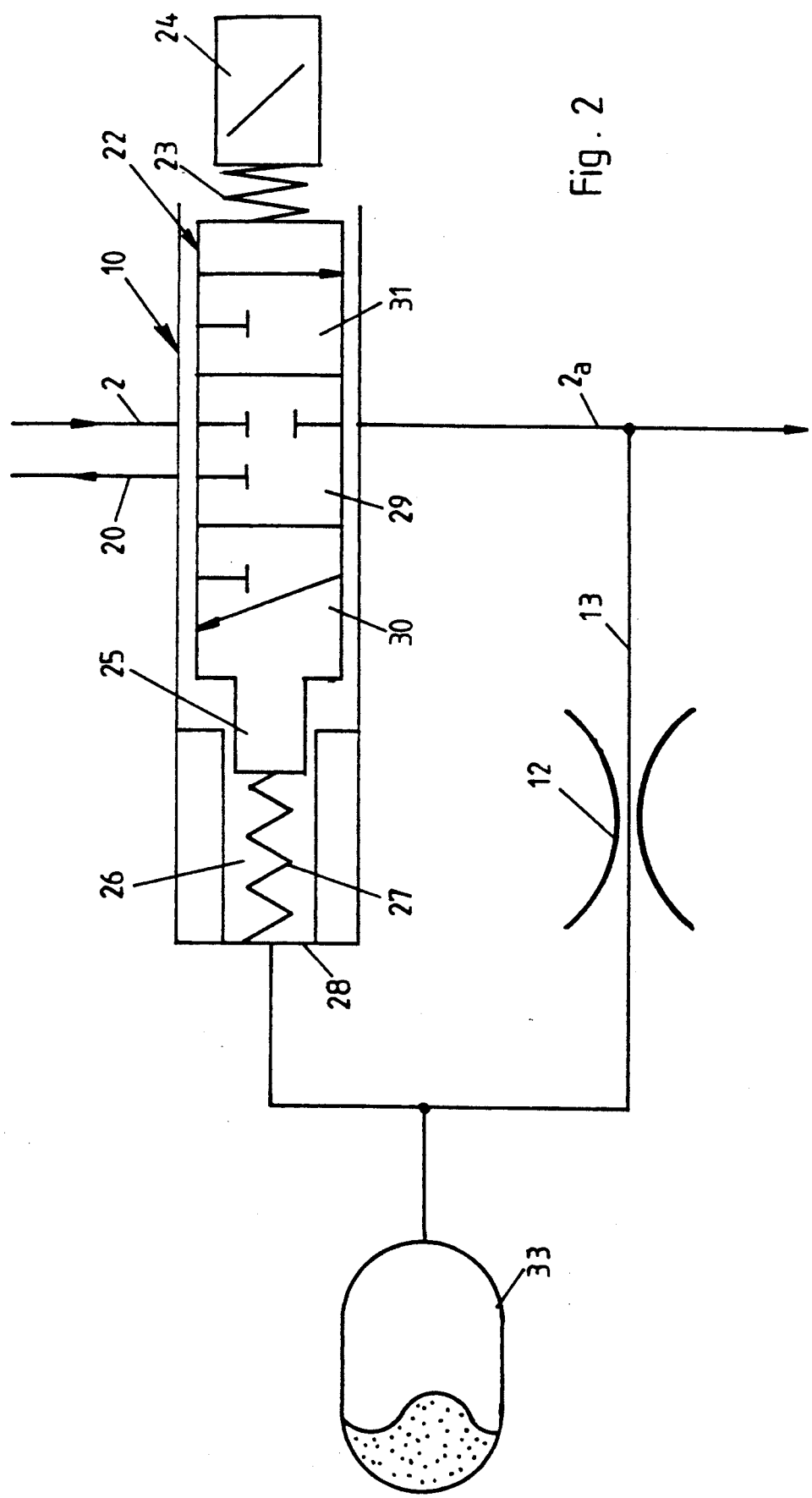
FIG. 2, in the form of a block circuit diagram, shows part of a partly active chassis control system in a further embodiment.

In FIG. 2, a slide 22 is located in the control valve 10, supported at one end via a spring 23 against a control magnet 24. On the other end, the slide 22, with a piston 25, engages the inside of the pressure chamber 26 and is supported in that chamber 26 via a spring 27 against the bottom 28 of the control valve 10. This piston 25 can be acted upon in the pressure chamber 26 by pressure from the shunt 13. As a result, the position of the slide 22 changes, so that the branch line 2 and return line 20 can be switched differently. In the blocking position shown, the branch line 2 is disconnected from the connection with the cylinder line 2a and the return line 20 is blocked off. If the slide 22 is shifted to the right, the line 2a between the shock absorber 1 and the control valve 10 is made to communicate with the return line. If the slide 22 is shifted to the left instead, then the return line 20 remains blocked, while a passage for pressure fluid from the reservoir 7 or pump 6 to the shock absorber 1 is opened. The middle blocking position of the slide 22 is indicated by reference numeral 29, the return position by reference numeral 30, and the inflow position by reference numeral 31.

The chassis control according to the invention is effected as follows:

If only a passive chassis control is required, then the damper valve 11 is switched to the blocking position, so that the shock absorber can carry out its normal, known function; the damping is essentially performed by the existing damping valves 32 in the damper piston 16. The reservoir 14 naturally also acts as an equalization means as well.

If sensors, not shown in further detail, ascertain that some different kind of control is desired, then the damper valve 11 switches to the open position, and the control valve 10 begins to function. If an inflow of pressure fluid from the shock absorber 1 is necessary, then the control valve 10 is switched to the inflow position 31 via the control magnet 24. If the average pressure in the chambers 15 and 17 subsequently rises, then pressure fluid flows via the throttle 12 into the pressure chamber 26, and via the piston 25 displaces the slide 22 to the closing position 29. As a result, additional pressure sensors on the shock absorber 1 or in the cylinder line 2a can be dispensed with. For this reason, high-frequency wheel motions and low-frequency motions of a vehicle body are processed separately by the control member 9. The control valve 10 can set a low-frequency pressure course, involved in the motion of the vehicle body, in accordance with a set-point value. High-frequency pressure superpositions, resulting in the shock absorber for instance from road unevenness, are precluded from directly affecting the control member 9 via the hydraulic low-pass filter comprising the throttle restriction 12 and a reservoir 33. Low-frequency pressure changes in accordance with the set-point value, however, can have direct access to the control member and can specify an average pressure in the spring cylinder.

The adjustable set-point pressure is thus the result of a balance of forces between the magnetic force of the control magnet 24 and the force comprising the pressure in the pressure chamber 26 and the effective surface area of the slide 22.

In FIG. 2, the additional reservoir 33 is also associated with the shut line 13 between the throttle 12 and the control valve 10. The reservoir must then be designed such that changes in position of the piston 25 will have no perceptible influence on the reservoir pressure, for instance, if the slide 22 is shifted to its inflow position 31 by the control magnet 24.

It should be understood that an adaptation must also be made between the throttle 12 and the reservoir 33, thereby defining the cutoff frequency of the low-pass characteristic.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A system for controlling spring cylinders that serve as a semiactive shock absorber for a vehicle body, in which
    said spring cylinders are disposed between wheel suspensions and the vehicle body, at least one chamber of each spring cylinder communicates via line means with a pressure fluid supply means,
    at least one control member (9) being connected between said pressure fluid supply means and the at least one chamber,
    said at least one control member (9) including a control valve (10), and further including a shunt line (13) disposed between the control valve (10) and a spring cylinder line (2a), said shunt line (13) includes a throttle (12) and discharges into a pressure chamber (26) provided in said control valve (10), a reservoir (33) is connected to said shunt line between said throttle and said pressure chamber (26) and together with said throttle forms a low-pass filter,
    said control valve being responsive to a change in pressure in the shunt line, said control valve further includes a slide means (22) provided with a piston (25) at one extremity thereof, the slide means being operable by motion of said piston within said at least one chamber, said pressure chamber (26) includes a spring (27) disposed between a bottom portion (28) thereof and the piston (25), the slide (22) is associated on an opposite extremity thereof, with a control magnet (24), and a low frequency pressure course involved in a motion of the vehicle body is set in accordance with a set-point value via said control valve (10).

2. A system as defined by claim 1, in which a spring is disposed between the opposite extremity of the slide and the magnet.

3. A system as defined by claim 1, in which the slide (22) has a return position (30), a blocking position (29), and an inflow position (31).

4. A system as defined by claim 3, in which pressure fluid is supplied to said spring cylinders from a pumping device (6) via a branch line (2) to the control valve (10) and via the cylinder line (2a) from the control valve to the at least one chamber (15) of the spring cylinder (1), and a return line (20) is provided from the control valve (10) to a pressure fluid supply reservoir (5).

5. A system as defined by claim 1, in which a shutoff valve (11) is provided in the at least one control member (9) for association with the control valve (10), and the shutoff valve is provided with an open position and a blocking position for the pressure fluid return from an upper chamber (15) of the spring cylinder.

* * * * *